(12) United States Patent
Yamamoto et al.

(10) Patent No.: US 8,383,921 B2
(45) Date of Patent: Feb. 26, 2013

(54) STICK OF STRING INSTRUMENT BOW, STRING INSTRUMENT BOW AND METHODS OF MANUFACTURING STICK OF STRING INSTRUMENT BOW

(75) Inventors: Akio Yamamoto, Hamamatsu (JP);
Hiroshi Nakaya, Hamamatsu (JP);
Tatsuya Hiraku, Hamamatsu (JP);
Toshiharu Fukushima, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 84 days.

(21) Appl. No.: 13/080,624

(22) Filed: Apr. 5, 2011

(65) Prior Publication Data

US 2011/0247475 A1 Oct. 13, 2011

(30) Foreign Application Priority Data

Apr. 7, 2010 (JP) .................................. 2010-88760

(51) Int. Cl.
*G10D 3/16* (2006.01)
(52) U.S. Cl. ........................................................ 84/325
(58) Field of Classification Search .................... 84/267, 84/274, 280, 282, 283
See application file for complete search history.

(56) References Cited

U.S. PATENT DOCUMENTS 7,795,515 B2 * 9/2010 Bartholomew ................. 84/282
2009/0050125 A1 * 2/2009 Davis et al. ................... 124/23.1

FOREIGN PATENT DOCUMENTS

| CN | 101673539 A | 3/2010 |
| JP | 7-281663 A | 10/1995 |
| JP | 3541756 A | 7/2004 |

OTHER PUBLICATIONS

Chinese Office Action issued for CN Application No. 201110082121.1, mailing date May 3, 2012 (English translation attached).

* cited by examiner

*Primary Examiner* — Kimberly Lockett
(74) *Attorney, Agent, or Firm* — Dickstein Shapiro LLP

(57) ABSTRACT

A stick of a string instrument bow includes a base material having an arched-rod shaped carbon fiber resin layer made of carbon fiber resin and a glass fiber resin layer which covers the outer surface of the carbon fiber resin layer and is made of glass fiber resin, and the glass fiber resin layer has a non-adhesion portion formed of an air layer present within the glass fiber resin layer and an adhesion portion which does not include the air layer.

5 Claims, 6 Drawing Sheets

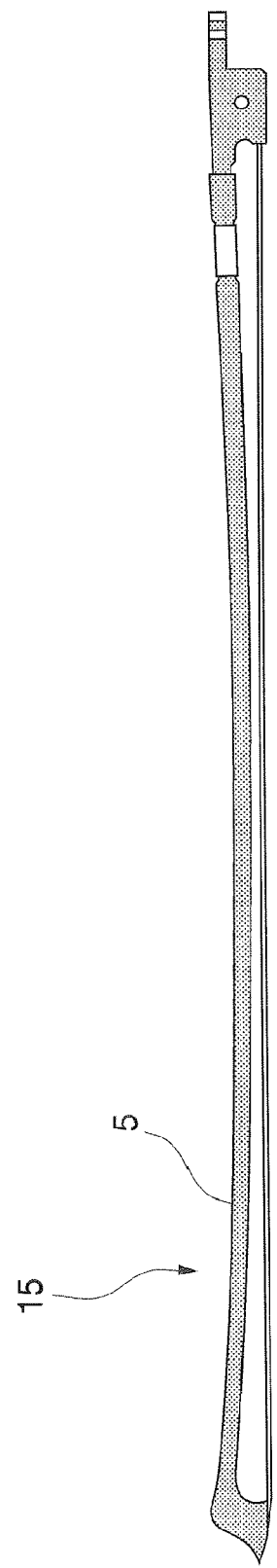

STICK OF STRING INSTRUMENT BOW, STRING INSTRUMENT BOW AND METHODS OF MANUFACTURING STICK OF STRING INSTRUMENT BOW

PRIORITY CLAIM

Priority is claimed on Japanese Patent Application No. 2010-88760, filed Apr. 7, 2010, the content of which is incorporated herein by reference.

BACKGROUND OF THE INVENTION

1. Field of the Invention

The present invention relates to a stick of a string instrument bow, string instrument bow and methods of manufacturing the stick of the string instrument how, and particularly to the string instrument bow which are formed with fiber-reinforced plastic as a base material and have a wood-grain appearance close to that of a natural wood material and to methods of manufacturing a string instrument bow.

2. Description of Related Art

Conventionally, natural wood materials have been used for a stick of a string instrument bow such as a violin, a cello, or the like. As the natural wood material, Fernambuco material, which is highly dense, hard, and tolerant of moisture, and exhibits excellent bending strength, has mainly been used.

However, it has become difficult to get the Fernambuco material due to the dramatic decline of the Fernambuco trees in recent years. Accordingly, a stick of a string instrument bow using a compound material (FRP (fiber reinforced plastic)) of resin and fibers such as carbon fibers, glass fibers, or the like instead of the natural wood material, such as the Fernambuco material, has been manufactured.

As a method of manufacturing such a stick using a compound material of carbon fibers and resin, a method of molding a curved object with a hollow structure capable of being used for a stick part of a bow of a violin by winding an FRP prepreg (pre-impregnated FRP) around a core metal, placing the resulting object within a metal mold, heating the metal mold to obtain a molded product, and then pulling out the core metal can be mentioned (see Japanese Patent No. 3541756, for example).

However, the stick of the string instrument bow made of fiber reinforced plastic obtained by using the conventional technique has a problem in that the appearance thereof is greatly different from that of the stick of the string instrument bow made of a natural wood material. Since subjective factors are included in the evaluation of the performance of a string instrument bow, and preconceived ideas based on the appearance of a stick greatly affect the evaluation of the performance of the string instrument bow by players or audiences. For this reason, it has been desired to improve the evaluation of the performance of a string instrument bow having a stick using fiber reinforced plastic by using the fiber reinforced plastic as a base material and obtaining a stick with a wood-grain appearance close to a natural wood material, and thereby improve the product value.

SUMMARY OF THE INVENTION

The present invention was made in view of the above circumstances, and an object thereof is to provide a stick of a string instrument bow which is formed of fiber reinforced plastic as a base material and has a wood-grain appearance close to a natural wood material. In addition, another object of the present invention is to provide a method of manufacturing a string instrument bow having a stick according to the present invention and a method of manufacturing the stick of a string instrument bow according to the present invention.

In order to achieve the above objects, the following configuration is employed in the present invention.

A stick of a string instrument bow of the present invention includes a base material having an arched-rod shaped carbon fiber resin layer made of carbon fiber resin and a glass fiber resin layer which covers the outer surface of the carbon fiber resin layer and is made of glass fiber resin, wherein the glass fiber resin layer has a non-adhesion portion formed of an air layer present within the glass fiber resin layer and an adhesion portion which does not include the air layer.

In addition, the string instrument bow of the present invention is characterized by including the stick according to the present invention.

A method of manufacturing the stick of a string instrument bow according to the present invention includes the steps of: forming a molding target product by winding a carbon fiber resin prepreg (carbon fiber impregnated with resin) around a rod-shaped core metal and then winding a glass fiber resin prepreg (glass fiber impregnated with resin) around the outside of the carbon fiber resin prepreg; and molding an arched-rod shaped molded product by placing the molding target product in an arched-rod shaped metal mold and heating the metal mold.

Since the stick of a string instrument bow of the present invention includes a base material having an arched-rod shaped carbon fiber resin layer made of carbon fiber resin and a glass fiber resin layer which covers the outer surface of the carbon fiber resin layer and is made of glass fiber resin, and the glass fiber resin layer has a non-adhesion portion formed of an air layer present within the glass fiber resin layer and an adhesion portion which does not include the air layer, a wood-grain pattern appears on the outer surface with multihued tones with contrasting density so as to have a spatial effect.

That is, according to the stick of a string instrument bow of the present invention, the non-adhesion portion and the adhesion portion have different adhesion states between the carbon fiber resin layer and the glass fiber resin layer and/or adhesion states between glass fibers included in the glass fiber resin layer. Since light is diffusely reflected by the air layer present in the glass fiber resin layer in the non-adhesion portion, the reflectance of the light in the non-adhesion portion is higher and more non-uniform as compared with that of the adhesion portion. As a result, the light reflectance and transmittance of the glass fiber resin layer become non-uniform in the stick according to the present invention, and the outer surface of the glass fiber resin layer has a multihued tone with color contrasting density.

More specifically, since the glass fiber resin layer does not include the air layer on the outer surface of its adhesion portion, the color of the carbon fiber resin layer arranged under the glass fiber resin layer appears therethrough, and the outer surface of the adhesion portion appears to have a color depending on the color of the carbon fiber resin layer. That is, when the carbon fiber resin layer is black, that is, the color of the carbon fibers, the outer surface of the adhesion portion appears to be black. On the other hand, since the transparency of the glass fiber resin layer is lowered due to the air layer present in the glass fiber resin layer in the non-adhesion portion, the outer surface of the non-adhesion portion appears be a color with variations between black and white when the carbon fiber resin layer is black.

In addition, according to the stick of a string instrument bow of the present invention, the thickness of the glass fiber resin layer is non-uniform due to the difference between the adhesion states in the non-adhesion portion and in the adhesion portion. Accordingly, the stick of the present invention has an appearance with a spatial effect.

Furthermore, since the glass fiber resin layer constituting the stick of a string instrument bow of the present invention includes glass fibers, the air layer constituting the non-adhesion portion is mainly formed linearly along the glass fibers. In addition, since the carbon fiber resin layer of the stick of the present invention has an arched-rod shape, the glass fibers in the glass fiber resin layer are fixed by the resin included in the glass fiber resin layer in a state in which the glass fibers are not completely straight but are gently curved in a part or the entirety thereof. As a result, the pattern formed by the non-adhesion portion and the adhesion portion is a linear pattern in which gradual curves are complicatedly combined, which appears to be a wood-grain pattern similar to the pattern formed by fibers of a natural wood material.

Accordingly, a wood-grain pattern appears on the outer surface with multihued tones and contrasting density so as to have a spatial effect, and the stick of the present invention has an appearance close to that of a natural wood material.

In addition, since the string instrument bow of the present invention is provided with the stick of the present invention, the string instrument bow is provided with a stick with an appearance close to that of a natural wood material.

In addition, since a method of manufacturing a stick of a string instrument bow according to the present invention includes the steps of: forming a molding target product by winding a carbon fiber resin prepreg around a rod-shaped core metal and then winding a glass fiber resin prepreg around the outside of the carbon fiber resin prepreg; and molding an arched-rod shaped molded product by placing the molding target product in an arched-rod shaped metal mold and heating the metal mold, it is possible to easily manufacture a stick of a string instrument bow with an appearance close to that of a natural wood material, in which a wood-grain pattern appears on the outer surface with multihued tones with contrasting density so as to have a spatial effect.

More specifically, since an arched-rod shaped molded product is molded in the molding step in the method of manufacturing the stick according to the present invention, a glass fiber resin prepreg is molded in the stick as a molded product, and a glass fiber resin layer having a non-adhesion portion constituted by an air layer an adhesion portion which does not include the air layer is formed.

The air layer constituting the non-adhesion portion is formed by fixing air contained in the glass fiber resin prepreg along with the glass fibers by the resin constituting the glass fiber resin prepreg in the molding step and causing the air to remain in the glass fiber resin layer as a molded product, and the air layer is mainly formed linearly along the glass fibers at a random position and depth in the glass fiber resin layer. In addition, since the molding target product is formed by winding the glass fiber resin prepreg around the outside of the carbon fiber resin prepreg, and an arched-rod shaped molded product is molded by heating the molding target product, the glass fibers in the glass fiber resin prepreg are arranged in the resin constituting the glass fiber resin prepreg and fixed in the glass fiber resin layer as a molded product in the state in which the glass fibers are not completely straight but are gently curved in a part or in the entirety thereof, in the molding step.

Therefore, according to the method of manufacturing the stick of the present invention, it is possible to obtain a stick of a string instrument bow with an outer surface in which a wood-grain pattern including a linear pattern of complicated combinations of gradual curves is formed with multihued tones and contrasting density so as to have a spatial effect, by providing the non-adhesion portion and the adhesion portion in the glass fiber resin layer constituting the stick as a molded product.

In addition, since the air layers constituting the non-adhesion portion are formed at random positions and depths in the glass fiber resin layer according to the manufacturing method of the stick of the present invention, the stick has an appearance which is much closer to that of a natural wood material as compared with the case in which the air layers are regularly arranged in the glass fiber resin layer.

BRIEF DESCRIPTION OF THE DRAWINGS

FIG. 3 is a perspective view showing one example of a string instrument bow according to an embodiment of the present invention.

DETAILED DESCRIPTION OF THE INVENTION

Hereinafter, a description will be made of an embodiment of the present invention with reference to the drawings.

Figure 1:
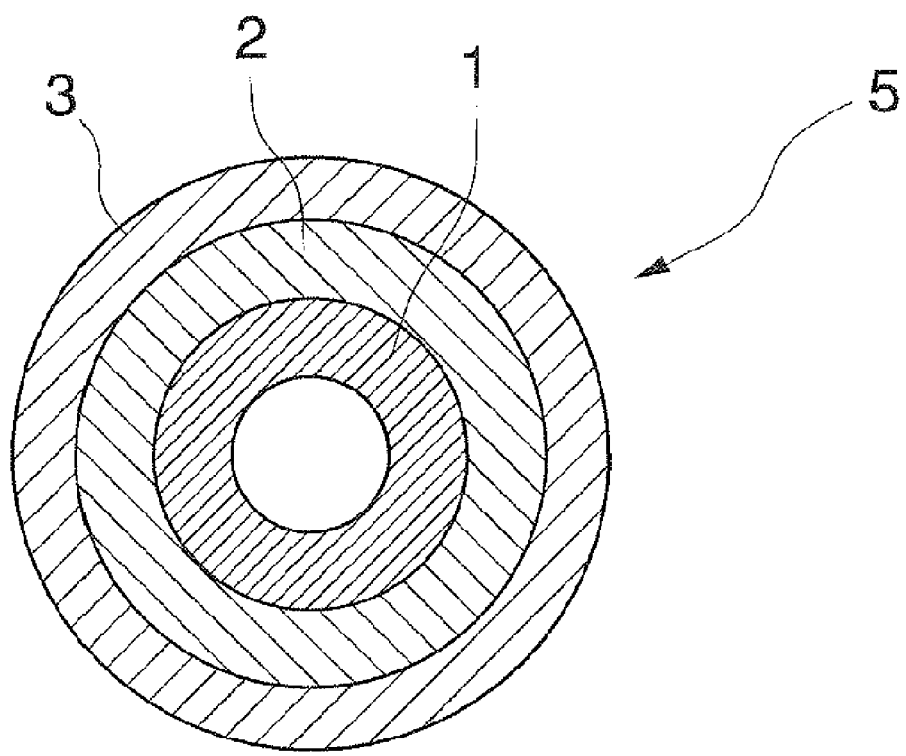
FIG. 1 is a schematic cross-sectional view showing one example of a stick of a string instrument bow according to an embodiment of the present invention.

FIG. 1 is a schematic cross-sectional view showing one example of a stick of a string instrument bow according to an embodiment of the present invention. A stick 5 of a string instrument bow of this embodiment has a substantially circular shape with a hollow center when viewed in cross section as shown in FIG. 1, and has an arched-rod shape in plan view. The stick 5 of this embodiment has a tapered side surface in which the length of the outer circumference gradually changes in the longitudinal direction.

As shown in FIG. 1, the stick 5 has a base material including a carbon fiber resin layer 1 and a glass fiber resin layer 2 which covers the outer surface of the carbon fiber resin layer 1, is provided with a coating film layer which covers the outer surface of the glass fiber resin layer 2 on the outer surface of the base material, and has an appearance close to that of a natural wood material.

The carbon fiber resin layer 1 is made of carbon fiber resin and has a bow shape. Any thickness of the carbon fiber resin layer 1 is applicable as long as it is possible to secure the rigidity of the stick 5, and the thickness is not particularly limited.

Any type of carbon fiber can be included in the carbon fiber resin layer 1 as long as it is possible to secure the rigidity as the stick 5, and the carbon fibers are not particularly limited. However, carbon fibers with a Young's modulus of $6 \times 10^3$ kgf/mm$^2$ or more and strength of 200 kgf/mm$^2$ or more are preferable in order to obtain appropriate rigidity as the stick 5.

Any type of resin can be included in the carbon fiber resin layer 1 as long as it is possible to secure the rigidity of the stick 5, and the type of resin is not particularly limited. However, it is possible to use unsaturated polyester resin, epoxy resin, or the like.

Although the content rate of the carbon fibers included in the carbon fiber resin layer 1 is not particularly limited, the content rate of the carbon fibers is preferably 30% or more in order to obtain an appropriate rigidity of the stick 5.

The glass fiber resin layer 2 is made of glass fiber resin and includes a non-adhesion portion which is constituted by an air layer present at a random position and depth in the glass fiber resin layer 2 and an adhesion portion which does not include the air layer. In the stick 5 shown in FIG. 1, a wood-grain pattern including a linear pattern in which gradual curves are complicatedly combined is formed on the outer surface of the glass fiber resin layer 2 with multihued tones and contrasting density so as to have a spatial effect.

The glass fiber resin layer 2 is provided at a predetermined thickness along the outer shape of the carbon fiber resin layer 1. Any thickness of the glass fiber resin layer 2 is applicable as long as it is possible to cover the outer surface of the carbon fiber resin layer 1, and the thickness is not particularly limited. However, the thickness is preferably in the range of 200 μm to 1000 μm. If the thickness of the glass fiber resin layer 2 exceeds the above range, there is concern that the texture of the glass fiber resin layer 2 as glass fiber resin may become noticeable and that it may become difficult to obtain an appearance close to that of a natural wood material. In addition, if the thickness of the glass fiber resin layer 2 is less than the above range, there is concern of the air layer included in the glass fiber resin layer becoming insufficient, the pattern on the outer surface of the glass fiber resin layer 2 being simplified, the spatial effect being lowered, and it becoming difficult to obtain an appearance close to that of a natural wood material Although the direction in which the glass fibers included in the glass fiber resin layer 2 extend is not particularly limited, a direction which is close to the longitudinal direction of the stick 5 is more preferable than a direction which is close to the width direction of the stick 5. When a stick of a string instrument bow is manufactured using a natural wood material, the direction of the wood grain of the natural wood material is generally set to be substantially parallel to the longitudinal direction of the stick. When more glass fibers included in the glass fiber resin layer 2 are set in a direction which is close to the longitudinal direction of the stick 5 as compared with glass fibers set in a direction which is close to the width direction of the stick 5, the pattern of the glass fiber resin layer 2, which is formed by the non-adhesion portion and the adhesion portion, becomes closer to the pattern of the wood grain of a natural wood material when the wood grain direction is set to be substantially parallel to the longitudinal direction of the stick 5, and the stick 5 with an appearance which is even closer to that of the natural wood material can be obtained.

In addition, since it is possible to sufficiently obtain the rigidity of the stick 5 with only the carbon fiber resin layer 1, and the function of the stick 5 is not damaged even if the rigidity is lowered due to the formation of the non-adhesion portion in the glass fiber resin layer 2 as compared with the case in which the non-adhesion portion is not formed in the glass fiber resin layer 2. Moreover, according to the stick 5 of this embodiment, since it is not necessary to adjust the rigidity of the stick 5 depending on the direction in which the glass fibers included in the glass fiber resin layer 2 extend, it is possible to arbitrarily change the extension direction of the glass fibers in accordance with the target appearance without damaging the function of the stick 5.

Since it is possible to sufficiently obtain the rigidity of the stick 5 only with the carbon fiber resin layer 1, it is possible to arbitrarily determine the Young's modulus, the thickness, the length, the content rate in the glass fiber resin layer 2, and the like of the glass fibers constituting the glass fiber resin layer 2 depending on the target appearance.

In addition, although the kind of resin included in the glass fiber resin layer 2 is not particularly limited, it is possible to use unsaturated polyester resin, epoxy resin, or the like, for example.

Any coating film layer 3 is applicable as long as it is constituted by a transparent or translucent coating film which can transmit the pattern formed on the outer surface of the glass fiber resin layer 2, and the coating film layer is not particularly limited. It is possible to enhance durability of the stick 5 and obtain an appearance which is even closer to that of a natural wood material by providing the coating film layer 3. Moreover, it is preferable that the coating film layer 3 is constituted by a brownish transparent or translucent coating film in order to obtain the stick 5 with an appearance which is even closer to that of a natural wood material. Furthermore, it is possible to arbitrarily determine the thickness of the coating film layer 3 within the range in which it is possible to penetrate the pattern formed on the outer surface of the glass fiber resin layer 2 in order to achieve a target appearance.

Next, description will be made of an example of a method of manufacturing the stick 5 of a string instrument bow shown in FIG. 1 as one example of a method of manufacturing the stick of a string instrument bow of according to the present invention.

Figure 2A:
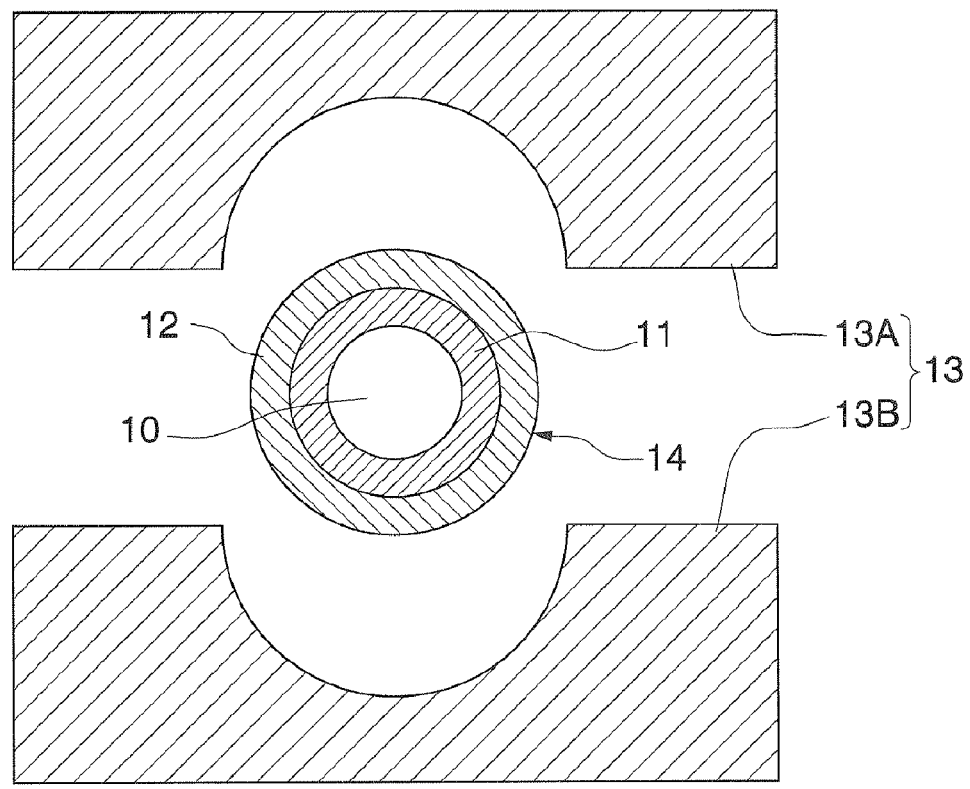
FIG. 2A is a cross-sectional view showing a method of manufacturing a stick of a string instrument bow according to an embodiment of the present invention.

First, as shown in FIG. 2A, a carbon fiber resin (CFRP) prepreg 11 is wound around a rod-shaped core metal (mandrel) 10 to have a predetermined thickness. In this embodiment, the rigidity of the stick 5 is set to be in an appropriate range by arbitrarily adjusting the thickness (the number of laminated layers) and the angle of the carbon fiber resin prepreg 11 to be wound when the carbon fiber resin prepreg 11 is wound around the core metal 10.

A outer shape of the core metal 10 in the region around which the carbon fiber resin prepreg 11 is wound has the same outer shape of the hollow portion of the stick 5 shown in FIG. 1. It is possible to use the core metal 10 which is made of metal such as iron, copper, or aluminum.

It is possible to use a unidirectional fabric, a bidirectional fabric, or the like as the carbon fibers constituting the carbon fiber resin prepreg 11.

It is possible to use a sheet-shaped, string-shaped, or ribbon-shaped carbon fiber resin prepreg 11. The thickness of the carbon fiber resin prepreg 11 is not particularly limited, and it is possible to use the carbon fiber resin prepreg 11 with a thickness which can be easily wound around the core metal 10.

Next, as shown in FIG. 2A, the glass fiber resin prepreg 12 is wound around the outside of the carbon fiber resin prepreg 11 to have a predetermined thickness, and a molding target product 14 is formed.

It is possible to use a unidirectional fabric, a bidirectional fabric, or the like as the glass fibers constituting the glass fiber resin prepreg 12, determination can be arbitrarily made in accordance with the target appearance, and the glass fibers are not particularly limited.

A sheet-shaped, string-shaped, or ribbon-shaped glass fiber resin prepreg can be used as the glass fiber resin prepreg 12. The thickness of the glass fiber resin prepreg 12 is not particularly limited. Nevertheless, the glass fiber resin prepreg 12 has such a thin thickness that the glass fiber resin prepreg 12 is easily wound around the metal core 10 to which the carbon fiber resin prepreg 11 has been wound, it is possible to easily adjust the thickness of the glass fiber resin layer 2, and the texture of the glass fiber resin layer 2 obtained after the molding is not noticeable when only one layer is wound.

Figure 2B:
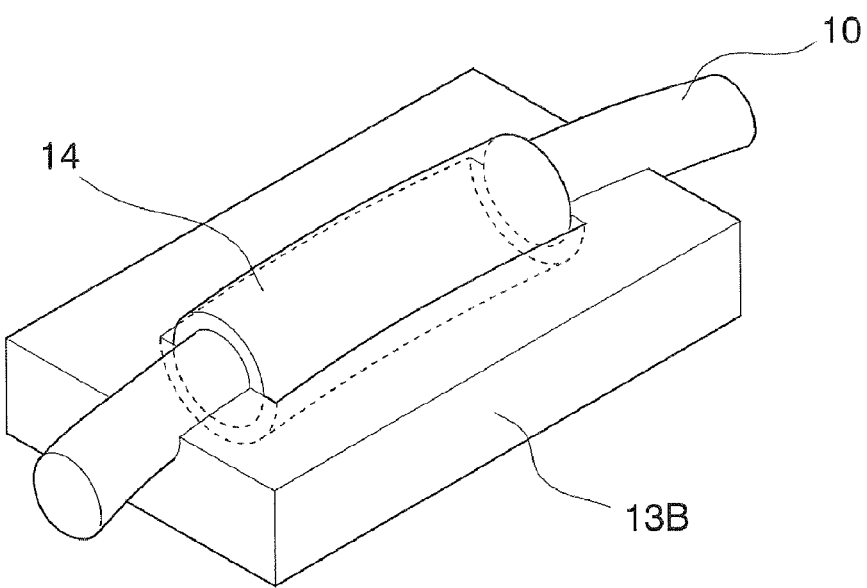
FIG. 2B is a perspective view showing a method of manufacturing the stick according to an embodiment of the present invention.

Next, as shown in FIGS. 2A and 2B, the molding target product 14 is installed within a metal mold 13. The metal mold 13 is constituted by an upper metal mold 13A and a lower metal mold 13B as shown in FIG. 2A. The metal mold 13 has a tapered inner wall surface in which the length of the inner circumference gradually changes in the longitudinal direction, and the inner shape of the metal mold 13 is an arched-rod shape corresponding to the shape of the stick 5 of a string instrument bow shown in FIG. 1.

An arched-rod shaped molded product is obtained by installing the molding target product 14 within the metal mold 13 and heating the metal mold 13. The conditions at the time of molding such as the heating temperature and the heating time can be arbitrarily determined based on the materials, the thicknesses, and the like of the carbon fiber resin prepreg 11 and the glass fiber resin prepreg 12 used in the molding target product 14 and are not particularly limited.

The amounts of the carbon fiber resin prepreg 11 and the glass fiber resin prepreg 12 to be wound around the core metal 10 are set as follows. That is, the sum of the contents of the carbon fiber resin prepreg 11 and the glass fiber resin prepreg 12 to be wound around the core metal 10 preferably ranges from 95 to 110% by volume and more preferably ranges from 100 to 104% by volume with respect to the content of the space (cavity) between the core metal 10 and the metal mold 13.

The glass fiber resin prepreg 12 is molded on the outer surface of the thus obtained molded product, and the glass fiber resin layer 2 including the non-adhesion portion which is constituted by the air layer present at a random position and depth in the glass fiber resin layer 2 and the adhesion portion which does not include the air layer is formed.

If the sum of the contents of the prepregs 11 and 12 is less than 95% by volume, sufficient pressure is not applied onto the molding target product 14 by the metal mold 13 and the core metal 10 in the process of arranging the molding target product 14 into the metal mold 13 and heating the metal mold 13. Accordingly, the molded product is more likely to be disfeatured, and it tends to be more difficult to obtain a molded product with a desired shape. In addition, the strength of the molded product becomes insufficient in some cases due to the insufficient adhesion among the wound prepregs.

If the sum of the contents of the prepregs 11 and 12 exceeds 110% by volume, excessive pressure is applied onto the molding target product 14 by the metal mold 13 and the core metal 10 in the process of arranging the molding target product 14 into the metal mold 13 and heating the metal mold 13, and therefore, the adhesion between the prepregs becomes strong. As a result, the non-adhesion portion is more likely reduced in the molded product, and it tends to be more difficult to obtain a wood-grain-like appearance due to the non-adhesion portion.

If the sum of the contents of the prepregs 11 and 12 ranges from 95 to 110% by volume, and particularly from 100 to 104% by volume, it is possible to obtain a desired normal shape and sufficient strength for the molded product. In addition, an appropriate amount of the non-adhesion portion is formed, and therefore, it is possible to obtain a particularly satisfactory wood-grain-like appearance.

With such a configuration, the molded product which is obtained in this embodiment has an arched-rod shaped appearance, which is close to that of a natural wood material, with an outer surface in which a wood-grain pattern appears with multihued tones with contrasting density so as to have a spatial effect.

In this embodiment, since the molded product as the stick 5 has an arched-rod shape in plan view, force is non-uniformly added from the metal mold 13 to the molding target product 14 during molding. Accordingly, the non-adhesion portion constituted by the air layer is easily formed in the glass fiber resin layer 2 formed in the molded product. In addition, since the stick 5 has tapered side surface in which the length of the outer circumference gradually changes in the longitudinal direction and is molded in this embodiment, the force is further non-uniformly added from the metal mold 13 to the molding target product 14 during molding. Therefore, the non-adhesion portion constituted by the air layer is more easily formed in the glass fiber resin layer 2 formed in the molded product.

On the other hand, since the force is uniformly added from the metal mold to the molding target product when the stick has a cylindrical shape with a constant diameter, the non-adhesion portion constituted by the air layer is not sufficiently formed in the glass fiber resin layer formed in the molded product.

Next, the thus obtained molded product is coated with a coating material to form the coating film layer 3. Although the method of forming the coating film layer 3 is not particularly limited, it is preferable to perform preprocessing for grinding and smoothing the surface of the molded product and coat the molded product with the coating material in order to enhance the adhesion between the glass fiber resin layer 2 and the coating film layer 3.

Through the above processes, the stick 5 of a string instrument bow, which has an appearance close to that of a natural wood material, shown in FIG. 1 is obtained.

Next, description will be made of the string instrument bow according to the present invention. FIG. 3 is a perspective view showing one example of a string instrument bow according to an embodiment of the present invention. The string instrument bow 15 shown in FIG. 3 includes the stick 5 shown in FIG. 1. Accordingly, the string instrument how 15 shown in FIG. 3 includes the stick 5 having an appearance close to that of a natural wood material.

Although the description was given for the example of the stick 5 with a substantially circular shape in cross section in this embodiment, the cross-sectional shape of the stick 5 is not particularly limited, and it is also applicable to use the metal mold 13 with a substantially octagon shape or a substantially ellipsoidal shape, for example, to form a substantially octagonal shaped stick 5 or a substantially ellipsoidal stick 5.

Working Example 1

The stick 5 of a string instrument bow shown in FIG. 1 was manufactured based on the following method.

First, the carbon fiber resin prepreg 11 (trade name: 3252S-10, manufactured by Toray Industries Inc.) was wound around the rod-shaped core metal 10. Thereafter, the glass fiber resin prepreg 12 (trade name: E13-35, manufactured by Sakai Composite Co., Ltd.) was wound around the outside of the carbon fiber resin prepreg 11 to form the molding target product 14. The number of windings of the prepregs 11 and 12 was set to 100% by volume with respect to the space (cavity) between the metal mold 13 and the core metal 10.

Subsequently, the arched-rod shaped molded product was molded by installing the molding target product 14 within the arched-rod shaped metal mold 13 and heating the metal mold 13 at 140° C. for one hour.

Then, the surface of the obtained molded product was ground and smoothed. Thereafter, the coating film layer 3 with a thickness of 50 μm was formed by coating the molded product with a brownish transparent urethane coating material, and the stick 5 of a string instrument bow was obtained.

Working Example 2

The same carbon fiber resin prepreg 11 as that in the working example 1 was wound around the core metal 10, and the same glass fiber resin prepreg 12 as that in the working example 1 was wound around the outside thereof to form the molding target product 14. The number of windings of the prepregs 11 and 12 was set to 104% by volume with respect to the space (cavity) between the metal mold 13 and the core metal 10. The heating of the molding target product 14, the grinding of the molded product, and the coating with the coating material were performed in the same manner as in the working example 1 to obtain a stick 5b of a string instrument bow.

Comparative Example

A stick 50 of a string instrument bow was manufactured in the same manner as in the working example 1 except for forming the molding target product 14 without winding the glass fiber resin prepreg 12 around the outside of the carbon fiber resin prepreg 11.

The appearances of the thus obtained sticks 5, 5b and 50 in the working examples 1 and 2 and in the comparative example were observed.

Figure 4:
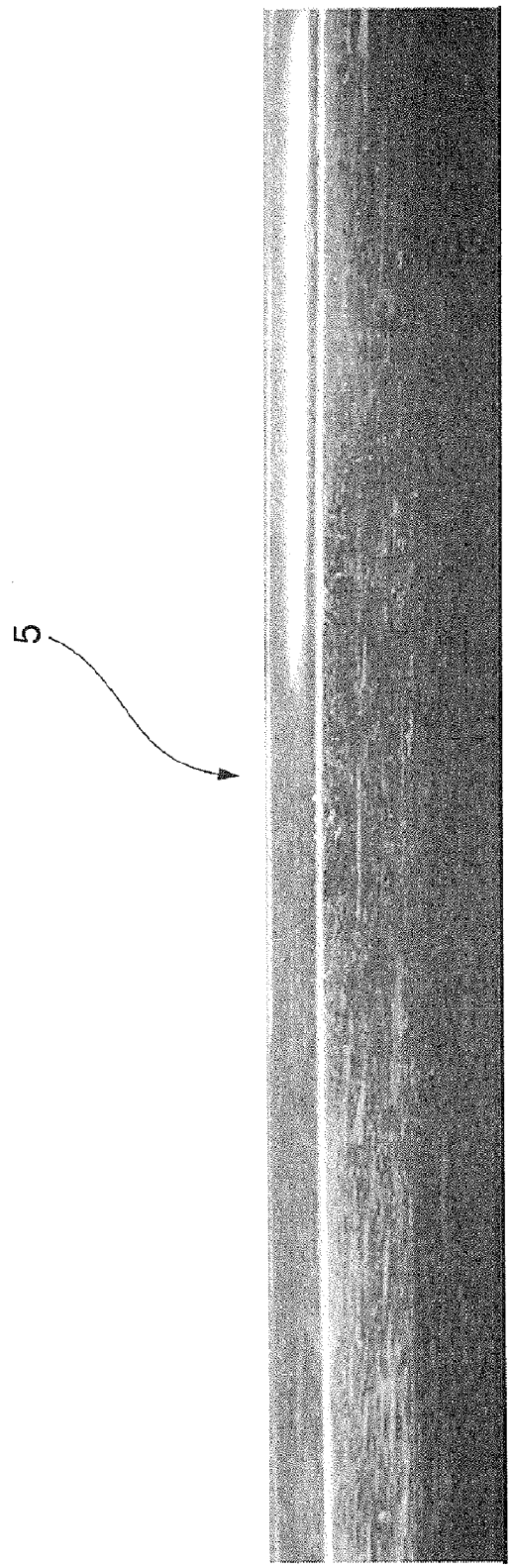
FIG. 4 is a picture of a bow according to a working example of the present invention.

FIG. 4 is a picture of the stick 5 according to a working example 1 of the present invention. As shown in FIG. 4, the stick 5 in the working example 1 had an excellent appearance, which was close to that of a natural wood material, with an outer surface in which a wood-grain pattern appeared with multihued tones and contrasting density so as to have a spatial effect.

Figure 5:
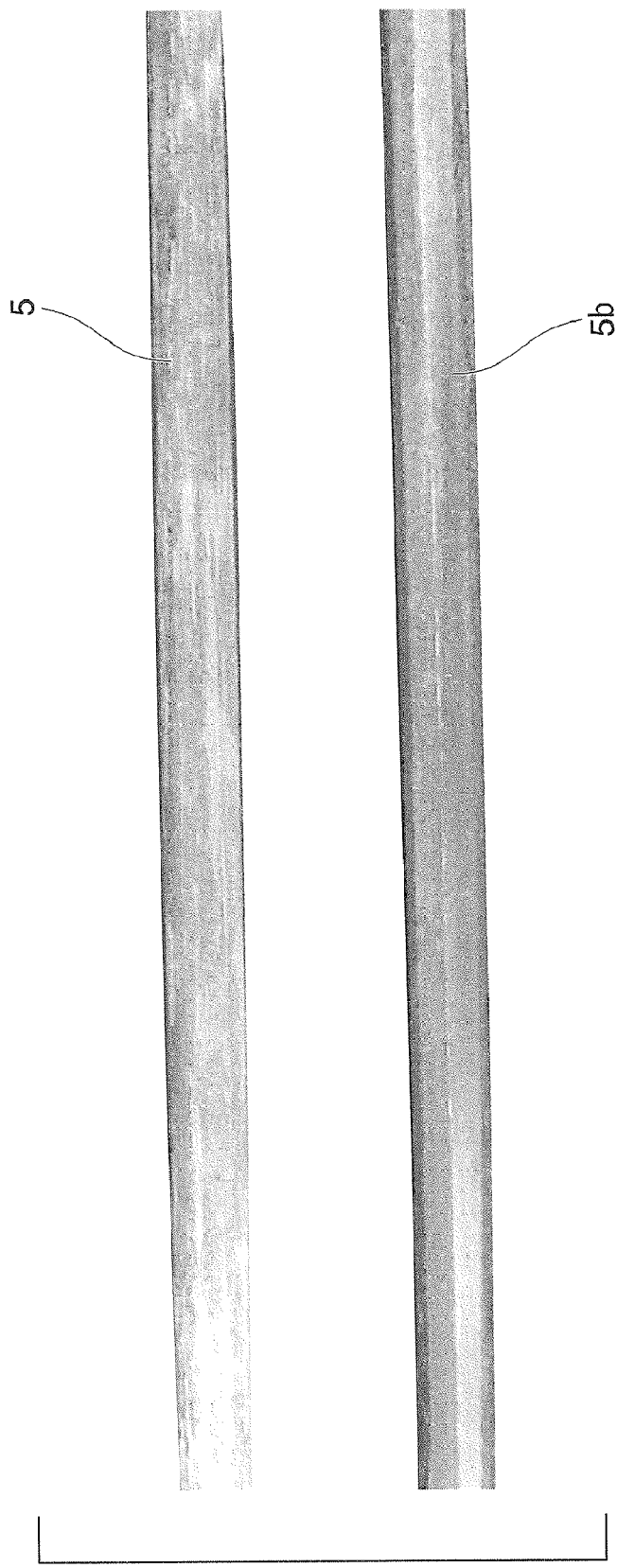
FIG. 5 is a picture showing sticks according to working examples 1 and 2 of the present invention.

Referring to the picture of FIG. 5, the sticks 5 and 5b in the working examples 1 and 2 will be compared. The stick 5b in the working example 2 with a larger number of windings of the prepregs (filling amount into the cavity) as compared with the stick 5 in the working example 1 had a more blackish appearance with a less evident wood-grain pattern. The stick 5b had a less evident wood-grain-like pattern because the non-adhesion portions were reduced as compared with the working example 1.

Thus, it is possible to change the appearance of the stick by increasing or decreasing the number of windings (filling amount into the cavity) of the prepreg within the preferable range.

Figure 6:
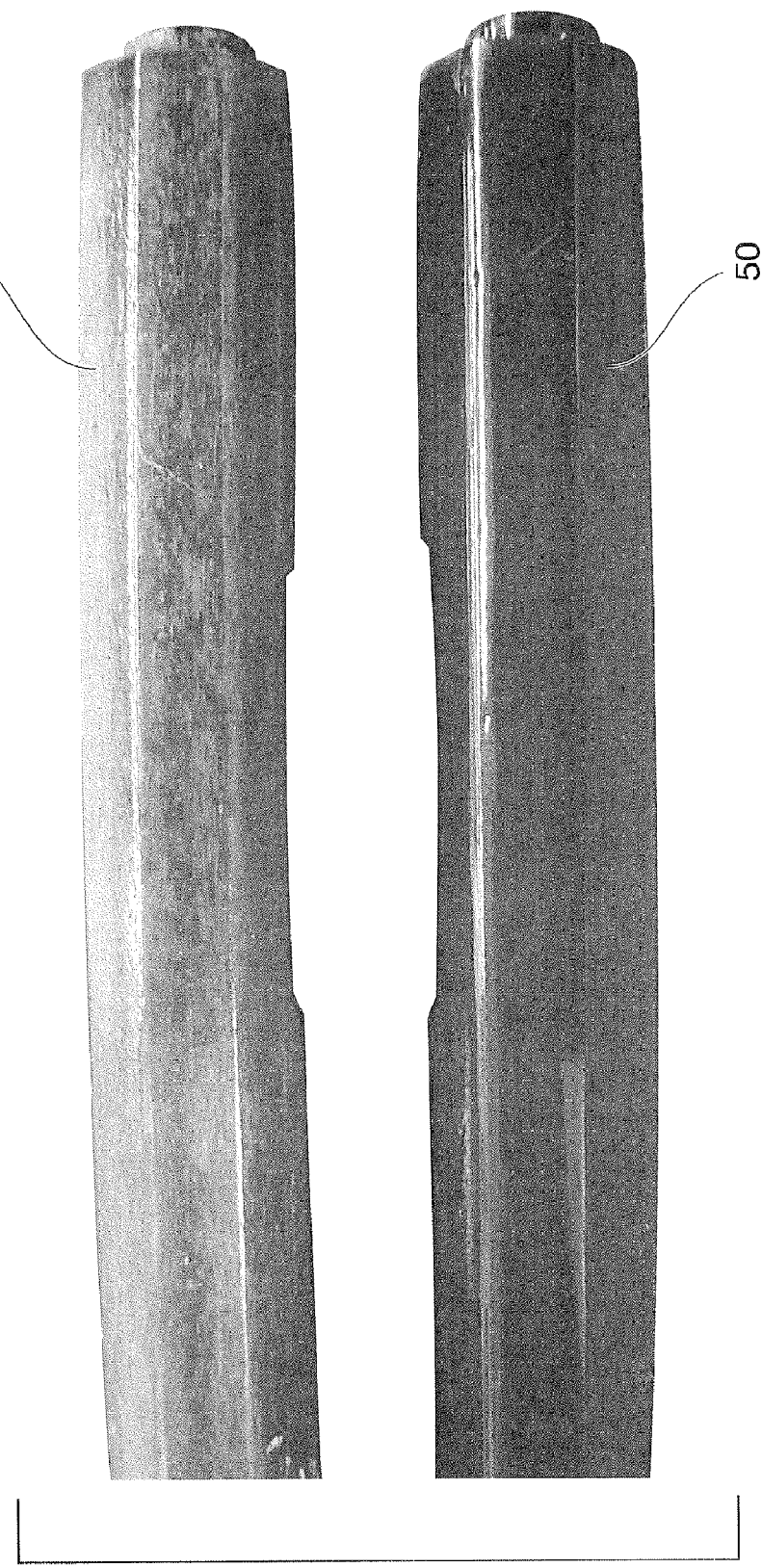
FIG. 6 is a picture showing sticks according to the working example 1 and a comparative example of the present invention.

Next, referring to the picture of FIG. 6, the sticks 5 and 50 in the working example 1 and the comparative example will be compared. The stick 5 in the working example 1 had an excellent appearance with a brown color as its basic tone, which was close to a natural wood material. On the other hand, the stick 50 in the comparative example had a uniform appearance in which the carbon fiber resin layer with a uniform black appearance appeared through a uniform brownish transparent coating film layer formed on the carbon fiber resin layer.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Moreover, it is possible to apply the present invention not only to a stick of a string instrument bow but also to a rod-shape structure.

What is claimed is:

1. A stick of a string instrument bow comprising:
    a base material having an arched-rod shaped carbon fiber resin layer and a glass fiber resin layer which covers an outer surface of the carbon fiber resin layer,
    wherein the glass fiber resin layer has a non-adhesion portion formed of an air layer present within the glass fiber resin layer and an adhesion portion which does not include the air layer.

2. A string instrument bow comprising the stick of a string instrument bow according to claim 1.

3. A method of manufacturing a stick of a string instrument bow comprising:
    forming a molding target product by winding a carbon fiber resin prepreg around a rod-shaped core metal and then winding a glass fiber resin prepreg around the carbon fiber resin prepreg; and
    molding an arched-rod shaped molded product by placing the molding target product in an arched-rod shaped metal mold and heating the metal mold.

4. The method of manufacturing a stick of a string instrument bow according to claim 3, wherein a sum of an amount of the carbon fiber resin prepreg and the glass fiber resin prepreg to be wound around the rod-shaped core metal ranges from 95 to 110% by volume with respect to a volume of a cavity between the rod-shaped core metal and the arched-rod shaped metal mold.

5. The method of manufacturing a stick of a string instrument bow according to claim 3, wherein a sum of an amounts of the carbon fiber resin prepreg and the glass fiber resin prepreg to be wound around the rod-shaped core metal ranges from 100 to 104% by volume with respect to a volume of a cavity between the rod-shaped core metal and the arched-rod shaped metal mold.

* * * * *